(12) United States Patent
Dolce et al.

(10) Patent No.: US 11,688,076 B2
(45) Date of Patent: Jun. 27, 2023

(54) SYSTEMS AND METHODS FOR PRODUCING A FLIPBOOK

(71) Applicant: FUJIFILM NORTH AMERICA CORPORATION, Valhalla, NY (US)

(72) Inventors: James Dolce, Penfield, NY (US); Nathaniel Curry, West Henrietta, NY (US); Ryan Moore, West Henrietta, NY (US)

(73) Assignee: FUJIFILM NORTH AMERICA CORPORATION, Valhalla, NY (US)

( * ) Notice: Subject to any disclaimer, the term of this patent is extended or adjusted under 35 U.S.C. 154(b) by 259 days.

(21) Appl. No.: 16/663,695

(22) Filed: Oct. 25, 2019

(65) Prior Publication Data

US 2021/0125359 A1    Apr. 29, 2021

(51) Int. Cl.
*G06T 7/20* (2017.01)
*H04N 5/14* (2006.01)
*G06T 5/00* (2006.01)

(52) U.S. Cl.
CPC ........... *G06T 7/20* (2013.01); *G06T 5/005* (2013.01); *H04N 5/147* (2013.01); *G06T 2207/20092* (2013.01); *G06T 2207/30168* (2013.01)

(58) Field of Classification Search
CPC . G06T 7/20; G06T 5/005; G06T 2207/20092; G06T 2207/30168; H04N 5/147; G06F 16/739; B42D 1/00
USPC .................................................. 382/274, 275
See application file for complete search history.

(56) References Cited

U.S. PATENT DOCUMENTS

| | | | | |
|---|---|---|---|---|
| 9,646,227 | B2 * | 5/2017 | Suri | G06T 7/20 |
| 2003/0214128 | A1 * | 11/2003 | Roberts | B42D 1/00 |
| | | | | 281/31 |
| 2005/0231602 | A1 * | 10/2005 | Obrador | G06T 7/20 |
| | | | | 348/208.14 |

(Continued)

OTHER PUBLICATIONS

Liu, Huayong, Wenting Meng, and Zhi Liu. "Key frame extraction of online video based on optimized frame difference." 2012 9th International Conference on Fuzzy Systems and Knowledge Discovery. IEEE, 2012. (Year: 2012).*

(Continued)

*Primary Examiner* — Geoffrey E Summers
(74) *Attorney, Agent, or Firm* — Baker Botts L.L.P.

(57) ABSTRACT

A system for producing a flipbook includes a processor that receives a video comprising a plurality of frames, selects a start frame and an end frame, and a plurality of frames therebetween. The processor can analyze the frames of the segment to determine an average rate of change of the plurality of frames and a threshold of relative image difference based on the average rate of change of the plurality of frames and a baseline frame rate. The processor can select, based on the results of its analysis, a plurality of selected frames, each of the selected frames being separated from two other selected frames by a sub-segment of the video, wherein each pair of adjacent frames comprises a relative image difference above the threshold and wherein each selected frame meets quality criteria not met by one or more local frames. The processor arranges the selected frames in temporal order, adds a protruding edge to each of the selected frames, and transmits data representing each of the selected frames to a printer for printing and binding a flipbook.

20 Claims, 4 Drawing Sheets

(56) References Cited

U.S. PATENT DOCUMENTS

| | | | | |
|---|---|---|---|---|
| 2007/0263128 | A1* | 11/2007 | Zhang | G11B 27/28 |
| | | | | 348/700 |
| 2008/0043259 | A1* | 2/2008 | Triplett | H04N 1/3873 |
| | | | | 358/1.9 |
| 2008/0144135 | A1* | 6/2008 | Miers | B42D 1/009 |
| | | | | 358/500 |
| 2010/0315664 | A1 | 12/2010 | Miers | |
| 2012/0007995 | A1* | 1/2012 | Barrett | G06T 13/80 |
| | | | | 348/207.1 |
| 2017/0372346 | A1* | 12/2017 | Asbury | G06Q 30/0621 |

OTHER PUBLICATIONS

NessAiver, Avisha. Edge-based automated facial blemish removal. Diss. University of Maryland, College Park, 2013. (Year: 2013).*

Deparkes. "Machine Learning vs Rules Systems." Deparkes, Nov. 23, 2017, https://deparkes.co.uk/2017/11/24/machine-learning-vs-rules-systems/. (Year: 2017).*

Dudley, Daniel. "Video Frame Rates: What Do They All Mean?" Flaunt Digital, May 23, 2019, https://flauntdigital.com/blog/video-frame-rates/ (Year: 2019).*

Gaubatz, Matthew, and Robert Ulichney. "Automatic red-eye detection and correction." Proceedings. International Conference on Image Processing. vol. 1. IEEE, 2002. (Year: 2002).*

David, Hurtado. Flipping Out: The Art of Flip Book Animation : Learn to illustrate & create your own animated flip books step by step , Quarto Publishing Group USA, 2016. ProQuest Ebook Central, pp. 20-23. http://ebookcentral.proquest.com/lib/usptll/detail.action?docID=4723371. (Year: 2016).*

Vanderbeeken, Robrecht. "Media art and the resurrection of an image: motion and sculpturing." Visual Studies 24.2 (2009): 149-162. (Year: 2009).*

Banwaskar, M., and A. Rajurkar. "Performance Analysis of Shot Change Detection Methods." International Conference on Communication and Signal Processing 2016 (ICCASP 2016). Atlantis Press, 2016. (Year: 2016).*

Extended European Search Report dated Dec. 21, 2020 in Application No. EP 20203893.

* cited by examiner

SYSTEMS AND METHODS FOR PRODUCING A FLIPBOOK

BACKGROUND OF THE DISCLOSED SUBJECT MATTER

Field of the Disclosed Subject Matter

The disclosed subject matter relates to methods and systems for producing a flipbook.

Description of the Related Art

A variety of systems for extracting images from video to create a flipbook are employed. These systems are generally capable of removing frames from a video to create a series of frames suitable for printing and binding in flipbook format. However, such systems are constrained by limited or non-existent video and/or image analysis capabilities and are therefore not known to select and/or produce frames of sufficient quality and desirability for printing. Thus, there remains a continued need for an efficient and economic system for producing an organized flipbook comprising high quality frames selected from a sequence of video representing a snapshot of action that occurred.

SUMMARY OF THE DISCLOSED SUBJECT MATTER

The purpose and advantages of the disclosed subject matter will be set forth in and are apparent from the description that follows, as well as will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes a system for producing a flipbook, the system comprising processing circuitry configured to receive a video comprising a plurality of frames and to select a start frame and an end frame of a subject of the video, as well as a plurality of frames therebetween defining a segment of the video. The processing circuitry is further configured to analyze the plurality of frames of the segment to determine an average rate of change of the plurality of frames and determine a threshold of relative image difference based on the average rate of change of the plurality of frames and a baseline frame rate. The processing circuitry is further configured to select, based on the results of analyzing the plurality of frames, a plurality of selected frames, each of the selected frames being separated from two other selected frames by a sub-segment of the video, wherein each pair of adjacent frames comprises a relative image difference above the threshold and wherein each selected frame meets quality criteria not met by one or more local frames. The processing circuitry is further configured to arrange the selected frames in temporal order, add a protruding edge to each of the selected frames, and transmit data representing each of the selected frames, in temporal order, to a printer for printing and binding a flipbook.

For purpose of illustration and not limitation, the system may include the processing circuitry being further configured to create a preview video comprising each of the selected frames and to display the preview video, by a display, at the expected flip rate of the flipbook.

For purpose of illustration and not limitation, the system may include wherein the threshold of relative image difference is determined using a machine learning algorithm.

For purpose of illustration and not limitation, the system may include the processing circuitry being further configured to select the start frame and the end frame of a subject of the video based on a user selection.

For purpose of illustration and not limitation, the system may further include the processing circuitry being configured to select the start frame and the end frame of a subject of the video is based on relative change based on configurable threshold/data change.

For purpose of illustration and not limitation, the system may include wherein each selected frame represents approximately ⅕ of a second of video.

For purpose of illustration and not limitation, the system may include wherein the length of each sub-segment varies based on the selection of frames that meet quality criteria that are not met by none or more local frames.

For purpose of illustration and not limitation, the system may include the processing circuitry being further configured to automatically edit the selected frames for quality, including one or more of the following: red eye reduction, brightness adjustment, blemish removal, and cropping.

For purpose of illustration and not limitation, the system may include the processing circuitry being further configured to present one or more of the selected frames to a user to optionally apply edits based on quality.

For purpose of illustration and not limitation, the system may further include wherein the frame rate of the video comprises one of 60 or 24 frames per second.

In accordance with another aspect of the disclosed subject matter, a method for producing a flipbook may comprise receiving, by processing circuitry, a video comprising a plurality of frames and selecting a start frame and an end frame of a subject of the video, as well as a plurality of frames therebetween defining a segment of the video. The method further comprises analyzing, by the processing circuitry, the plurality of frames of the segment to determine an average rate of change of the plurality of frames and determining, by the processing circuitry, a threshold of relative image difference based on the average rate of change of the plurality of frames and a baseline frame rate. The method further includes selecting, by the processing circuitry, based on the results of analyzing the plurality of frames, a plurality of selected frames, each of the selected frames being separated from two other selected frames by a sub-segment of the video, wherein each pair of adjacent frames comprises a relative image difference above the threshold and wherein each selected frame meets quality criteria not met by one or more local frames. The method further comprises arranging, by the processing circuitry, the selected frames, in temporal order, editing, by the processing circuitry, to add a protruding edge to each of the selected frames, and transmitting, by the processing circuitry, data representing each of the selected frames, in temporal order, to a printer for printing and binding a flipbook.

For purpose of illustration and not limitation, the method may include creating, by the processing circuitry, a preview video comprising each of the selected frames and displaying the preview video, by a display, at the expected flip rate of the flipbook.

For purpose of illustration and not limitation, the method may include wherein the threshold of relative image difference is determined using a machine learning algorithm.

For purpose of illustration and not limitation, the method may include wherein selecting the start frame and the end frame of a subject of the video is based on a user selection.

For purpose of illustration and not limitation, the method may include wherein selecting the start frame and the end frame of a subject of the video is based on relative change based on configurable threshold/data change.

For purpose of illustration and not limitation, the method may include wherein each selected frame represents approximately ⅕ of a second of video.

For purpose of illustration and not limitation, the method may include wherein the length of each sub-segment varies based on the selection of frames that meet quality criteria not met by the one or more local frames.

For purpose of illustration and not limitation, the method may include wherein the selected frames are automatically edited for quality, including one or more of the following: red eye reduction, brightness adjustment, blemish removal, and cropping.

For purpose of illustration and not limitation, the method may include wherein one or more of the selected frames is presented to a user to optionally apply edits based on quality.

For purpose of illustration and not limitation, the method may include wherein the frame rate of the video comprises one of 60 or 24 frames per second.

It is to be understood that both the foregoing general description and the following detailed description and drawings are examples and are provided for purpose of illustration and not intended to limit the scope of the disclosed subject matter in any manner.

The accompanying drawings, which are incorporated in and constitute part of this specification, are included to illustrate and provide a further understanding of the devices of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which.

DETAILED DESCRIPTION

Figure 1:
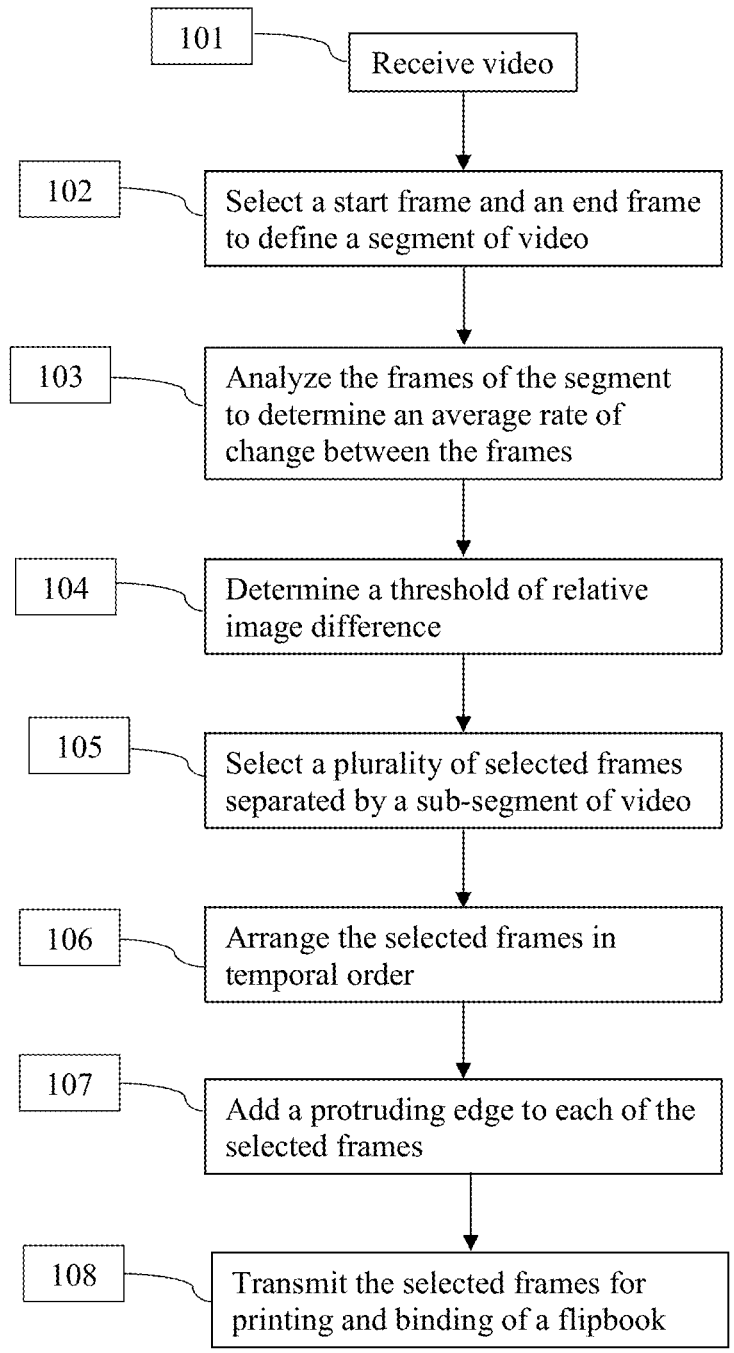
FIG. 1 is a flow chart illustrating a representative method for producing a flipbook, implemented according to an illustrative embodiment of the disclosed subject matter.

Reference will now be made in detail to embodiments of the disclosed subject matter, an example of which is illustrated in the accompanying drawings. The disclosed subject matter will be described in conjunction with the detailed description of the system.

In accordance with the above-described need, the present disclosure provides efficient and economic systems and methods for producing a flipbook from a video input, including the selection of high quality frames from a sequence of frames in a video. The methods and systems disclosed herein can be used, for example, to produce a flipbook comprising a number of selected frames per second of video. Additionally and/or alternatively, utilizing the disclosed methods and systems, frames of the highest quality can be selected from relevant portions of video, improving the overall quality of a printed and bound flipbook. Additionally and/or alternatively, the methods and systems disclosed herein can be used to select one or more high quality frames from a video for a variety of purposes, including, for example, the selection of high quality printed frames or the production of a film strip depicting a plurality of selected frames, which can be of varying sizes, such as to fit in a wallet, for framing, or as large-scale wall art. Additionally and/or alternatively, the methods and systems disclosed herein can be used to select one or more high quality frames for printing from a short video, which can provide efficient systems and methods for quickly producing high quality photographs from a video. By providing for the automatic selection of one or more high quality frames from the frames contained in a short video, the disclosed methods and systems can improve systems in which the speed of production and the quality of photographs is desired, such as for school photographs or photographs for official documents, such as passports and driver's licenses.

As embodied herein, a system 400 for producing a flipbook is disclosed, including a flipbook production system 407 comprising a memory 409 and processor 408 comprising processing circuitry configured to receive a video 200 made up of a plurality of frames 201 and to perform various functions thereto. Memory 409 can be configured to store instructions for execution by the processor, as well as various system data including input data, output data, and intermediate data being operated upon by the processor 408. Flipbook production system 407 can be configured to receive data, including but not limited to video data and command data, over a network 405, from a user interface system 401, which can include a memory 402, a processor 403 comprising processing circuitry, a display 404, and a user input module 413. User input module 413 can include one or more of a variety of input devices, including for example a mouse, a keyboard, a touchscreen, a microphone, or a trackpad. In some embodiments, user interface system 401 can comprise a mobile device such as a smartphone, tablet, or other handheld personal computing device. In some embodiments, user interface system 401 can comprise a self-service kiosk. Additionally and/or alternatively, user interface system 401 can be integrated into flipbook production system 407. As embodied herein, system 400 can include a printer/binder 406, configured to send and/or receive data from one or more of the flipbook production system 407, user interface system 401, and an image organizing module 410. Image organizing module 410 can include memory 411 and processor 412 and can be configured to receive input data of or relating to frame images and can be configured to automatically perform analysis and processing functions related to image quality, as will be discussed in greater detail with respect to the disclosed systems. As embodied herein, all of flipbook production system 407, printer/binder 406, user system interface 401 and image organizing module 410 can be separate systems communicating via network 405 and/or via direct connection or can be combined in any combination to form one or more integrated systems.

Figure 2:
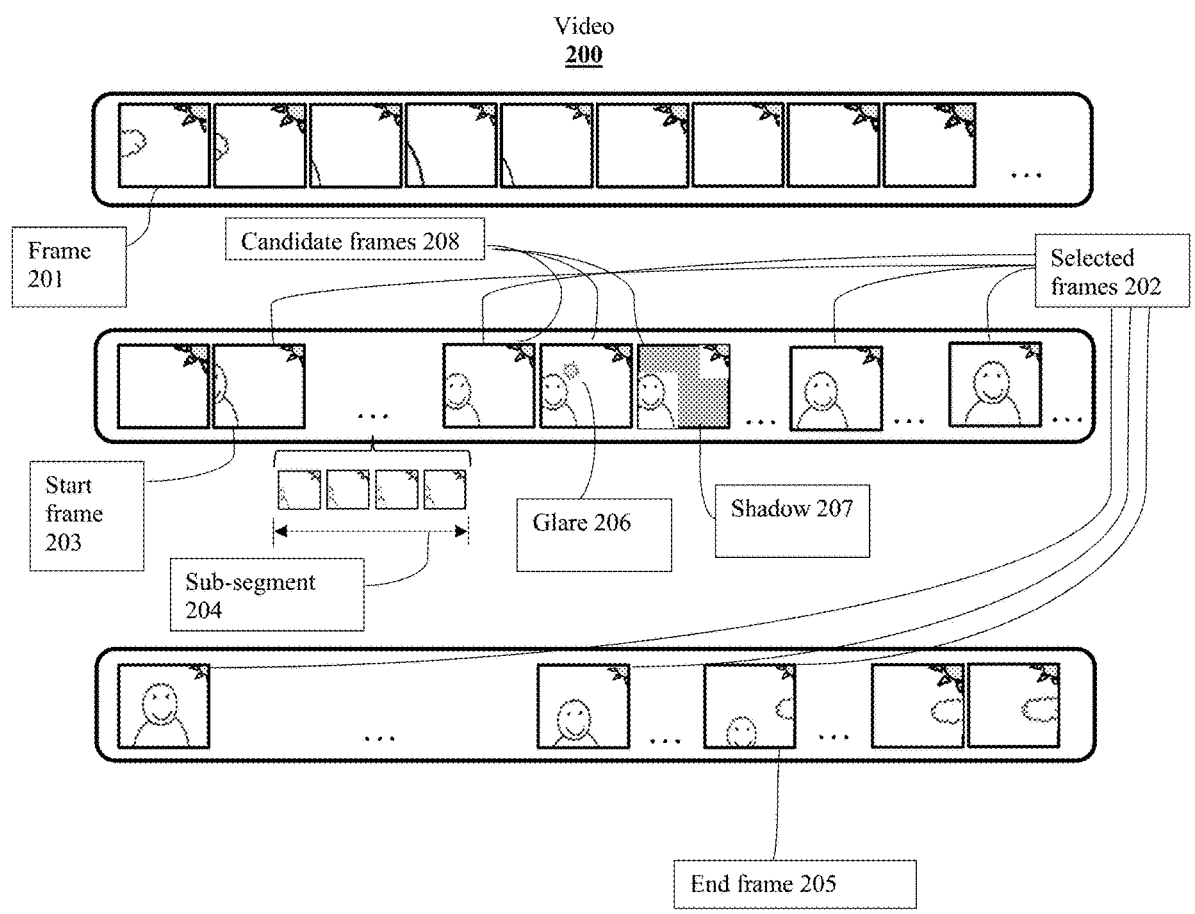
FIG. 2 is a diagram illustrating representative features of a video input into a system for producing a flipbook according to an illustrative embodiment of the disclosed subject matter.
Figure 3:
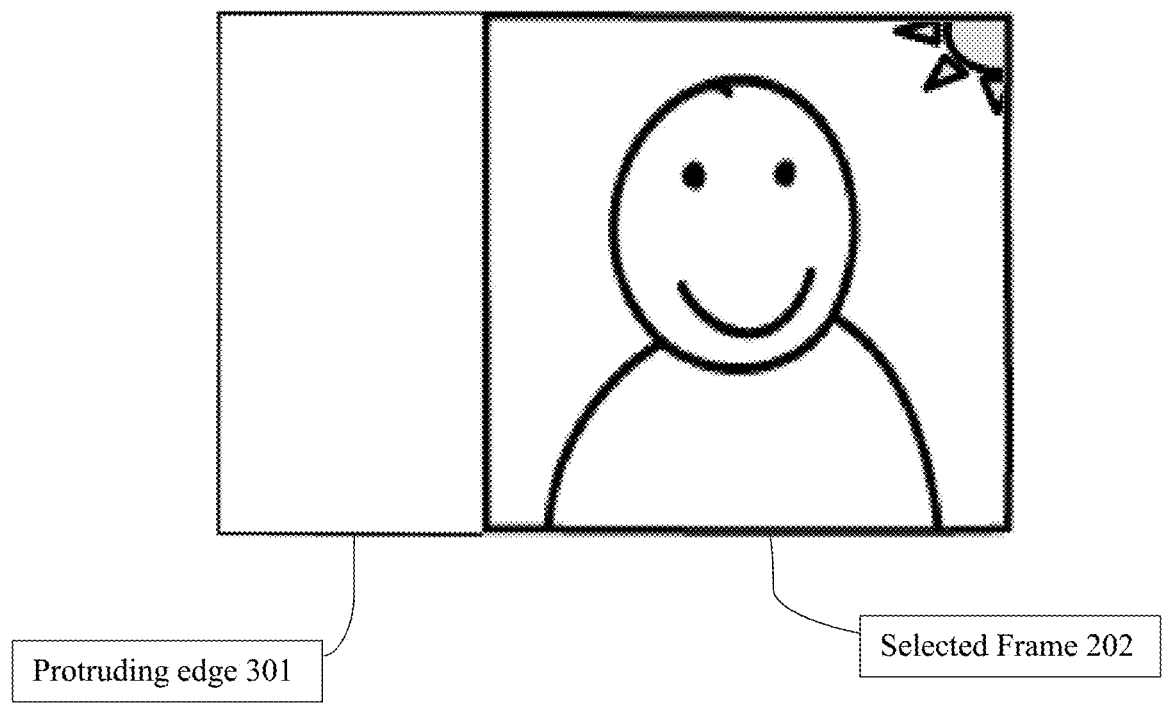
FIG. 3 is a diagram illustrating a frame of a video edited for inclusion in a flipbook produced according to an illustrative embodiment of the disclosed subject matter.
Figure 4:
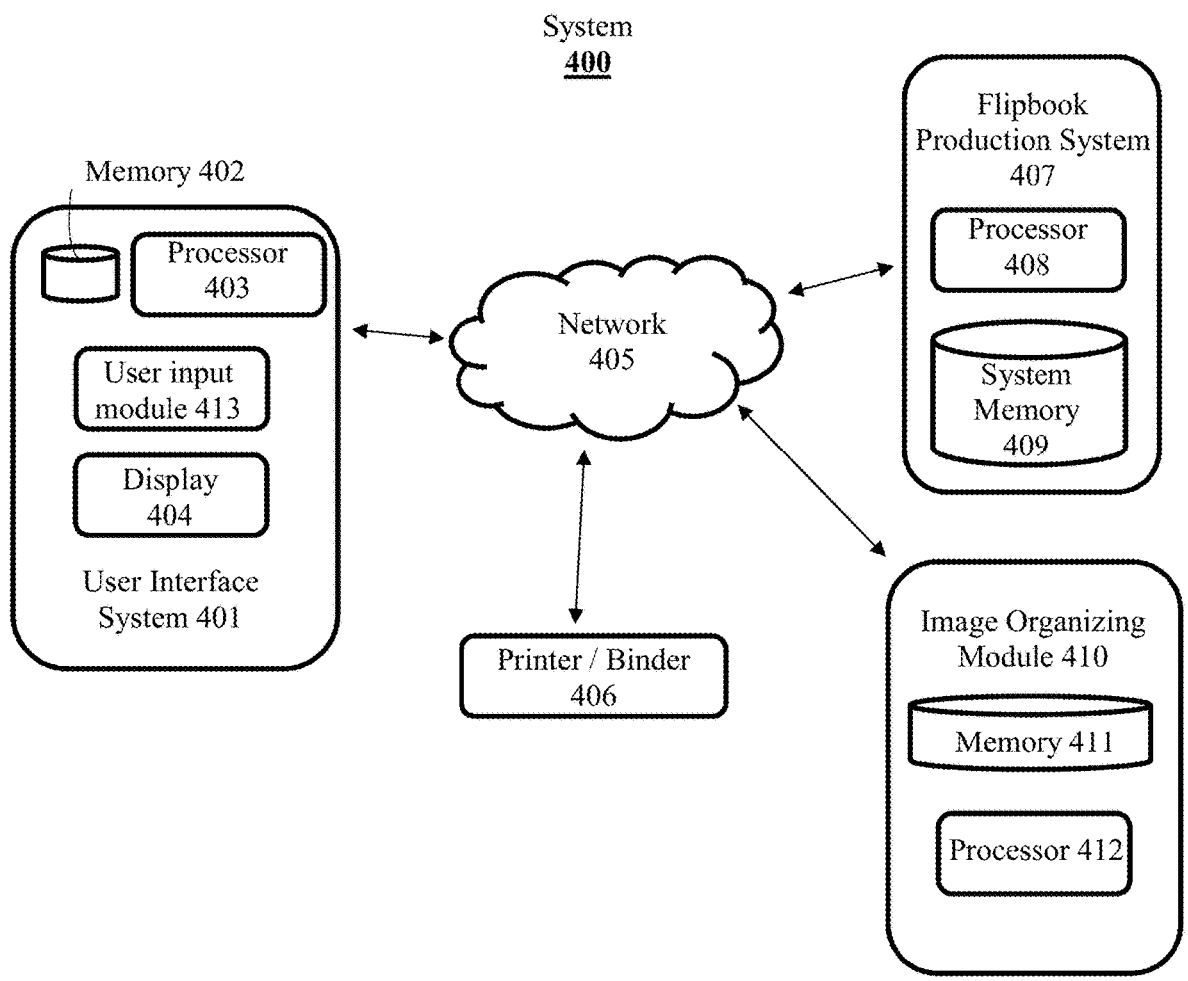
FIG. 4 is a schematic diagram of a representative system for producing a flipbook according to an illustrative embodiment of the disclosed subject matter.

As embodied herein, processing circuitry of processor 408 can be configured to select a start frame 203 and an end frame 205 of a subject of the video. For example, and certainly not by way of limitation, a video may include a snapshot of action, such as by depicting a diver or a snowboarder performing an action. As depicted in FIG. 2, the subject of the video may be a person entering the frame of the video and performing some movement. As embodied herein, the plurality of frames 201 defined between the start frame 203 and the end frame 205 form a segment of the video. As embodied herein, processor 408 can be configured to select a start frame 203 and an end frame 205 by determining when "action" starts and stops, so the flipbook does not contain irrelevant front or end portions comprising frames that do not include the subject of the video and/or frames that are highly similar to one another.

In some embodiments, processor 408 can use statistical keyframing to select start frame 203 by selecting a frame at which the video begins to exhibit a predetermined percentage change from frame to frame. This predetermined percentage can be optimized manually, based on manipulatable user settings and/or based on machine learning techniques. Similarly, processor 408 can be configured to select an end frame 205 by selecting a frame at which the change from frame to frame of the video begins to fall below the predetermined percentage change. In this manner, processor 408 can be configured to execute an algorithm that automatically stores the frames at which data transitions from relatively "static" to "dynamic," and to define a segment of the video comprising the frames between the start frame 203 and end frame 205, after which the frames become relatively "static" again. Additionally and/or alternatively, processor 408 can be configured using machine learning to find probable start frames and end frames 203 and 205 respectively, based on the presence of particular amounts and/or types of actions beginning or ending on the frames 201 of an input video 200. For example, and certainly not by way of limitation, linear and/or non-linear statistical models can be used to track changes in image data such that it can identify a key frame. In addition, and/or alternatively, key frames can be identified by training a data set on a user defined learning set that designates key frames or desirable transition examples. In addition and/or alternatively, a model can be developed to apply to unknown data sets to identify equally valuable start and end targets for segments or key frames.

In some embodiments, processor 408 can be configured to select a start frame 203 and an end frame 205, and can be further configured to begin analysis of frames at a frame located certain number of frames before or after the selected start frame 203 and/or the selected end frame 205. For example, and certainly not by way of limitation, processor 408 can select a start frame 203 and can be configured to begin analysis of frames 201 at a frame preceding the start frame 203 by five frames. In this manner, processor 408 can be configured to select frames of the highest quality in the area of the video that represents the starting point of action of the video. Additionally, and/or alternatively, processor 408 can be configured to allow a user to select start frame 203 and end frame 205.

As embodied herein, to produce a flipbook, the processor can be configured to select a number of representative frames from the segment of video, the number of selected frames being less than the total number of frames in the segment of video.

As embodied herein, the processing circuitry of processor 408 can be configured to analyze the plurality of frames of the segment of video between start frame 203 and end frame 205 to determine an average rate of change of the plurality of frames and to determine a threshold of relative image difference based on the average rate of change of the plurality of frames, as well as a baseline frame rate. The processing circuitry is further configured to select, based on the results of analyzing the plurality of frames, a plurality of selected frames 202, each of the selected frames being separated from two other selected frames by a sub-segment 204 of the video, wherein each pair of sequential selected frames comprises a relative image difference above the threshold and wherein each selected frame meets quality criteria not met by one or more local frames. For example, and certainly not by way of limitation, processor 408 can, based on analysis of the frames 201 of the segment of video, determine that the average rate of change between each frame 201 is 20%, i.e., that on average, 20% of the pixels of each frame are different than the pixels of the previous frame. Accordingly, in this example, processor 408 can be configured to set the threshold of relative image difference at a value equal to or greater than 20%.

Additionally and/or alternatively, processor 408 can be configured to adjust the threshold of relative image difference based on machine learning inputs, by which the processor can be configured to determine the threshold relative image difference based on the nature of the source video. For example, a video with a background depicting trees in the wind could comprise a high rate of change between the plurality of frames. Accordingly, as embodied herein, if the intended subject of a video is a person walking in front of trees in the wind, the processor 408 can be configured to be sensitive enough to detect that change by setting the threshold of relative image difference to be a value higher than it would be set if the background pixels were not changed at as high of a rate. Conversely, if, for example, a video begins on a blue sky with no clouds, and the intended subject of the video is a bird flying across that sky, then the threshold of relative image difference could be determined to be a lower value based on the lower average rate of change between the plurality of frames. Additionally and/or alternatively, the threshold of relative image difference can be configured using variable Pearson correlation, to set a linear statistical comparison as a variable in the application.

In accordance with another aspect of the disclosed subject matter, and with reference to FIG. 1, a method for producing a flipbook can comprise receiving, at step 101, by processing circuitry of processor 408, a video 200 comprising a plurality of frames 201.

As embodied herein, at step 102, processor 408 can be configured to select a start frame 203 and an end frame 205 of a subject of the video 200. As discussed above, processor 408 can be configured to select a start frame 203 and an end frame 205 by determining when "action" starts and stops, so the flipbook does not contain irrelevant front or end portions.

In some embodiments, processor 408 can use statistical keyframing to select start frame 203 by selecting a frame at which the video begins a predetermined percentage change begins from frame to frame. This predetermined percentage can be optimized manually, based on manipulatable user settings and/or based on machine learning techniques. Similarly, processor 408 can be configured to select an end frame 205 by selecting a frame at which the change from frame to frame of the video begins to fall below the predetermined percentage change. In this manner, processor 408 can be configured to execute an algorithm that automatically stores the frames at which data transitions from relatively "static" to "dynamic," and to define a segment of the video comprising the frames between the start frame 203 and end frame 205, after which the frames become relatively "static" again. Additionally and/or in alternatively, processor 408 can be configured using machine learning to find probable start frames and end frames 203 and 205 respectively, based on the presence of particular amounts and/or types of actions beginning or ending on the frames 201 of an input video 200.

In some embodiments, processor 408 can be configured to select a start frame 203 and an end frame 205, and can be further configured to begin analysis of frames at a frame located certain number of frames before or after the selected start frame 203 and/or the selected end frame 205. For example, and certainly not by way of limitation, processor 408 can select a start frame 203 and can be configured to begin analysis of frames 201 at a frame preceding the start frame 203 by five frames. In this manner, processor 408 can be configured to select frames of the highest quality in the area of the video that represents the starting point of action of the video. Additionally, and/or alternatively, processor 408 can be configured to allow a user to select start frame 203 and end frame 205.

As embodied herein, by selecting a start frame 203 and an end frame 205, the discloses system defines a segment of the input video comprising a plurality of frames 201 between the start frame 203 and the end frame 205.

As embodied herein, the method may further comprise, at step 103, by the processing circuitry of the processor 408, analyzing the plurality of frames 201 of the segment of input video, to determine an average rate of change of the plurality of frames. The processing circuitry of processor 408 can then determine, at step 104, a threshold of relative image difference based on the average rate of change of the plurality of frames and a baseline frame rate. The baseline frame rate of a video is the incoming frame rate of the source video on which the system will operate. For example, and certainly not by way of limitation, video is commonly recorded at rates of 24 frames per second (fps) or 60 fps. However, the disclosed system is certainly not limited to those incoming frame rates, and the system disclosed herein can operate using video of any baseline frame rate.

At step 104, processing circuitry of processor 408 can be configured to analyze the plurality of frames 201 of the segment of video between start frame 203 and end frame 205 to determine a threshold of relative image difference based on the average rate of change of the plurality of frames and a baseline frame rate. For example, and certainly not by way of limitation, processor 408 can, based on analysis of the frames 201 of the segment of video, determine that the average rate of change between each frame 201 is 20%, i.e., that on average, 20% of the pixels of each frame are different than the pixels of the previous frame. Accordingly, in this example, processor 408 can be configured to set the threshold of relative image difference at a value equal to or greater than 20%.

Additionally and/or alternatively, processor 408 can be configured to adjust the threshold of relative image difference based on machine learning inputs, by which the processor 408 can be configured to determine the threshold relative image difference based on the nature of the source video. For example, a video with a background depicting trees in the wind could comprise a high rate of change between the plurality of frames. Accordingly, as embodied herein, if the intended subject of a video is a person walking in front of trees in the wind, the processor 408 can be configured to be sensitive enough to detect that change by setting the threshold of relative image difference to be a value higher than it would be set if the background pixels were not changed at as high of a rate. Conversely, if, for example, a video begins on a blue sky with no clouds, and the intended subject of the video is a bird flying across that sky, then the threshold of relative image difference could be determined to be a lower value based on the lower average rate of change between the plurality of frames. Additionally and/or alternatively, the threshold of relative image difference can be configured using variable Pearson correlation, to set a linear statistical comparison as a variable in the application.

The method further includes, at step 105, selecting, by the processing circuitry, based on the results of analyzing the plurality of frames 201, a plurality of selected frames 202. As shown in FIG. 2, each of the selected frames 202 is separated from two other selected frames by a sub-segment 204 of the video. Each of the sub-segments 204 that divide each pair of selected frames 202 can be of an approximately equal length. Additionally and/or alternatively, each pair of adjacent, selected frames 202 can comprise a relative image difference above the threshold. Additionally and/or alternatively, selected frames 202 can be selected based on quality, such that each of the selected frames 202 can be established as meeting criteria not met by one or more local frames 201 surrounding the selected frames 202. In this manner, the disclosed system can produce a high quality flipbook that depicts the action of the subject of a video, while utilizing the highest quality images available to the processor 408.

In some embodiments, it is advantageous to produce flipbooks comprising approximately 25 pages. Accordingly, if an incoming video 200 captures 5 second of action and is recorded at 60 fps, a selected frame 202 should be selected out of approximately every 12 frames of the video segment from start frame 203 to end frame 205. Similarly, if an incoming video 200 captures 5 second of action and is recorded at 24 fps, a selected frame 202 should be selected out of approximately every 5 frames of the video segment.

Selecting frames based on quality at step 105, such that each of the selected frames 202 meets quality criteria not met by one or more local frames 201 surrounding the selected frames 202 can include, for example, altering the number of frames included in one or more sub-segments 204, to account for the selection of high quality frames in the same region of video as the frame at which the system would select a frame based on the average rate of change between the plurality of frames, processor 408 also being configured to select frames such that each sub-segment is approximately the same length. For example, and certainly not by way of limitation, if the base frame rate and desired number of selected frames for inclusion in a flipbook suggests that for every selected frame, a sub-segment of video should span approximately 0.2 seconds of input video, processor 408 can be configured to analyze frames within, for example, every 0.16-0.24 seconds, to locate the highest quality frames for inclusion in the flipbook.

At step 105, image organizing module 410 can be configured to receive frames from the flipbook production system 407 for analysis based on quality. Frames transmitted to the image organizing module 410 can be stored in memory 411 for processing by processor 412. For example, and certainly not by way of limitation, image organizing module 410 can receive a plurality of frames within the same region from which the processor 408 indicates a selected frame 202 should be chosen. Those frames can be analyzed for quality, including, but not limited to, based on features such as one or more of lighting, blemishes, the presence of red eye if applicable, focus of the frame, cropping of the frame, exposure, noise, blur and/or focus, contrast and brightness, faces and face prominence, open eyes, smiling and subject positioning, and or content description of elements in the image, and color optimization. For example, and not by way of limitation, the frames can be analyzed for different quality characteristics using one or more heuristic techniques. Additionally and/or alternatively, image organizing module 410 can analyze each frame to determine the orientation of the subject of the source video (i.e., horizontal or vertical) and if the source video is vertical, each frame can be rotated so that the subject is properly oriented when held horizontally in the form of a flipbook. For example, and certainly not by way of limitation, processor 408 can be configured to select candidate frames from a region of the video segment, for analysis by the image organizing module 410. If three candidate frames 208 are received by the image organizing module 410 and one frame contains a glare 206, and a second frame contains an undesirable shadow 207, and the third frame does not have the presence of those defects or other disqualifying defects, the third frame can be selected as the selected frame 202 from that portion of the video segment, indicating that it is the highest quality frame available. Image organizing module 410 can therefore be configured to transmit an indication that a certain candidate frame 208 is the highest quality frame from a given region of the video segment. Additionally and/or alternatively, image organizing module 410 can be configured to edit frames to correct quality defects. For example, and not by way of limitation, image organizing module 410 can correct identified defects in one or more of lighting, defects due to blemishes, the presence of red eye, focus of the frame, cropping of the frame, and color optimization. Image organizing module can therefore be configured to transmit one or more candidate frames 208 to the flipbook production system 407, indicating which frames are of the highest quality after the image organizing module 410 has carried out edits to further improve quality. In this manner, the overall quality of the flipbook product can be further improved.

In some embodiments, the processor 408 can be configured to allow one or more of the selected frames to be presented to a user to optionally apply edits based on quality. For example, and not by way of limitation, image organizing module can be configured to transmit, to the flipbook production system and/or the user interface system, for display to a user, one or more edits that can be optionally applied to one or more frames to improve quality. A user can select, using the user input module 213, which, if any, of the proposed edits should be applied to selected frames.

In some embodiments, selecting frames based on quality can result in the processor 408 being configured to select frames such that the length of each sub-segment is not the same. Processor 408 can therefore be configured with one or more parameters, which may be configurable through the use of a machine learning algorithm or a user selection, to determine the acceptable variation among the lengths of each sub-segment 204 between each pair of selected frames. The one or more parameters can be directly related to the desired length of sub-segments 204, the desired quality of one or more frames, the length of the flipbook to be produced, and/or the baseline frame rate.

As embodied herein, the method can further include, at step 106, arranging the selected frames 202, by the processing circuitry of processor 408, in temporal order.

As embodied herein, at step 107, the method can include the processor 408 being further configured to add a protruding edge 301 to each of the selected frames 202. As embodied herein, the method can, at step 108, transmit, from flipbook production system 407, data representing each of the selected frames 202, arranged in temporal order, to a printer/binder 406 for printing and binding a flipbook.

In some embodiments, the method may include creating, by the processing circuitry, a preview video comprising each of the selected frames, and displaying the preview video, by a display 404, at the expected flip rate of the flipbook. Display 404 may be configured at the user interface system 401, and processor 403 thereof can be configured to allow user control of the preview video, including but not limited to being configured to provide prompts for the user to decide whether a preview should be displayed, at what rate the preview should be displayed, and whether any modifications should be made to the selection of frames based on the preview. In some embodiments, for example, the method may include the processor 408 being configured to allow a user to select the start frame 203 and the end frame 205 of a subject of the video 200 after the preview has been displayed.

As disclosed herein, in some embodiments, instructions for processors 403, 408, and/or 412 can be stored in memory devices 402, 409, and/or 411. Memory can, additionally or alternatively, store data for use by the one or more processors. In some embodiments, if suitable, memory devices 402, 409, and/or 411 can include random access memory (RAM), dynamic RAM (DRAM) or static RAM (SRAM) and if suitable, the RAM can be single-ported or multi-ported RAM. This disclosure contemplates any suitable RAM.

In some embodiments, the disclosed systems can include one or more storage devices for storing data or instructions. For example, and certainly not by way of limitation, storage can include a hard disk drive (HDD), a floppy disk drive, flash memory, an optical disc, a magneto-optical disc, magnetic tape, or a Universal Serial Bus (USB) drive or a combination of two or more of these. Storage can include removable or non-removable media, as suitable, and can be internal or external to one or more of the user interface system 401, flipbook production system 407, and image organizing module 410. Additionally and/or alternatively, the disclosed system can include a single storage device, which can be embodied in one or more storage modules. In some embodiments, storage can be non-volatile, solid-state memory. In some embodiments, storage can include read-only memory (ROM), including, for example, one or more of mask ROM, programmable ROM (PROM), erasable PROM (EPROM), electrically erasable PROM (EEPROM), electrically alterable ROM (EAROM), or flash memory or a combination of two or more of these. This disclosure contemplates storage taking any suitable physical form. This disclosure contemplates, as suitable, any type of network 405 and any suitable network interface. The disclosed systems and methods can be embodied on a computer-readable non-transitory storage medium or media.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the methods and systems of the disclosed subject matter without departing from the spirit or scope of the disclosed subject matter. Thus, it is intended that the disclosed subject matter include modifications and variations within the scope of the claims and their equivalents.

What is claimed is:

1. A system for producing a flipbook comprising processing circuitry configured to:
   receive a video comprising a plurality of frames;
   select a start frame and an end frame of a subject of the video, and a plurality of frames therebetween defining a segment of the video, wherein the start frame is selected based on a predetermined percentage change relative to a previous frame;
   analyze the plurality of frames of the segment to determine an average rate of change of the plurality of frames by comparing a number of pixels in one of the plurality of frames to a number of pixels in a previous frame;
   determine a threshold of relative image difference based on the average rate of change of the plurality of frames and a baseline frame rate, wherein the threshold is adjustable based on the nature of the video;
   select, based on the results of analyzing the plurality of frames, a plurality of selected frames, each of the selected frames being separated from two other selected frames by a sub-segment of the video, wherein each pair of selected sequential frames comprises a relative image difference above the threshold and wherein each selected frame meets quality criteria not met by one or more local frames;
   arrange the selected frames in temporal order;
   add a protruding edge to each of the selected frames; and
   transmit data representing each of the selected frames, in temporal order, to a printer for printing and binding a flipbook.

2. The system of claim 1, wherein the processing circuitry is further configured to:
   create a preview video comprising each of the selected frames; and
   display the preview video, by a display, at an expected flip rate of the flipbook.

3. The system of claim 1, wherein the threshold of relative image difference is determined using a machine learning algorithm.

4. The system of claim 1, wherein the processing circuitry is further configured to select the start frame and the end frame of a subject of the video based on a user selection.

5. The system of claim 1, wherein the processing circuitry is further configured to select the start frame and the end frame of a subject of the video is based on relative change based on configurable threshold and/or configurable data change.

6. The system of claim 1, wherein the length of each sub-segment varies based on the selection of frames that meet quality criteria not met by the one or more local frames.

7. The system of claim 1, wherein the processing circuitry is further configured to automatically edit the selected frames for quality, including one or more of the following: red eye reduction, brightness adjustment, blemish removal, and cropping.

8. The system of claim 1, wherein the processing circuitry is further configured to present one or more of the selected frames to a user to optionally apply edits based on quality.

9. The system of claim 1, wherein the frame rate of the video-is one of 60 or 24 frames per second.

10. The system of claim 1, wherein the processing circuitry is further configured analyze at least one of:
    a plurality of frames before or after the start frame, and begin analyzing the segment at a frame of the plurality of frames before or after the start frame which has a highest quality; and
    a plurality of frames before or after the end frame, and stop analyzing the segment at a frame of the plurality of frames before or after the end frame which has a highest quality.

11. A method for producing a flipbook comprising:
    receiving, by processing circuitry, a video comprising a plurality of frames;
    selecting, by the processing circuitry, a start frame and an end frame of a subject of the video, and a plurality of frames therebetween defining a segment of the video, wherein the start frame is selected based on a predetermined percentage change relative to a previous frame;
    analyzing, by the processing circuitry, the plurality of frames of the segment to determine an average rate of change of the plurality of frames;
    determining, by the processing circuitry, a threshold of relative image difference based on the average rate of change of the plurality of frames by comparing a number of pixels in one of the plurality of frames to a number of pixels in a previous frame and a baseline frame rate, wherein the threshold is adjustable based on the nature of the video;
    selecting, by the processing circuitry, based on the results of analyzing the plurality of frames, a plurality of selected frames, each of the selected frames being separated from two other selected frames by a sub-segment of the video, wherein each pair of selected sequential frames comprises a relative image difference above the threshold and wherein each selected frame meets quality criteria not met by one or more local frames;
    arranging, by the processing circuitry, the selected frames, in temporal order;
    editing, by the processing circuitry, to add a protruding edge to each of the selected frames; and
    transmitting, by the processing circuitry, data representing each of the selected frames, in temporal order, to a printer for printing and binding a flipbook.

12. The method of claim 11, further comprising:
    creating, by the processing circuitry, a preview video comprising each of the selected frames; and
    displaying the preview video, by a display, at an expected flip rate of the flipbook.

13. The method of claim 11, wherein the threshold of relative image difference is determined using a machine learning algorithm.

14. The method of claim 11, wherein selecting the start frame and the end frame of a subject of the video is based on a user selection.

15. The method of claim 11, wherein selecting the start frame and the end frame of a subject of the video is based on relative change based on configurable threshold and/or configurable data change.

16. The method of claim 11, wherein the length of each sub-segment varies based on the selection of frames that meet quality criteria not met by the one or more local frames.

17. The method of claim 11, wherein the selected frames are automatically edited for quality, including one or more of the following: red eye reduction, brightness adjustment, blemish removal, and cropping.

18. The method of claim 11, wherein one or more of the selected frames is presented to a user to optionally apply edits based on quality.

19. The method of claim 11, wherein the frame rate of the video is one of 60 or 24 frames per second.

20. The method of claim 11, further comprising analyzing at least one of:
- a plurality of frames before or after the start frame, and beginning analyzing the segment at a frame of the plurality of frames before or after the start frame which has a highest quality; and
- a plurality of frames before or after the end frame, and stopping analyzing the segment at a frame of the plurality of frames before or after the end frame which has a highest quality.

* * * * *